United States Patent

Paidosh

[15] 3,704,369
[45] Nov. 28, 1972

[54] X-RAY FILM CASSETTE

[72] Inventor: Richard L. Paidosh, Saint Anthony, Minn.

[73] Assignee: Minnesota Mining and Manufacturing Company, St. Paul, Minn.

[22] Filed: Feb. 1, 1971

[21] Appl. No.: 111,526

[52] U.S. Cl. ................... 250/65 R, 250/68, 250/213
[51] Int. Cl. ............................................. G03b 41/16
[58] Field of Search ............................. 250/68, 65 R

[56] References Cited

UNITED STATES PATENTS 2,590,891  4/1952  Reuter .................... 250/68
3,591,804  7/1971  Minasian ................. 250/68

Primary Examiner—James W. Lawrence
Assistant Examiner—C. E. Church
Attorney—Kinney, Alexander, Sell, Steldt & Delahunt

[57] ABSTRACT

An X-ray cassette which is convenient for changing the film and which is thin and light-weight. The cassette provides intimate contact between the intensifying screens and the X-ray-sensitive film by the use of continual magnetic forces.

14 Claims, 3 Drawing Figures

PATENTED NOV 28 1972

3,704,369

INVENTOR.
RICHARD L. PAIDOSH
BY Kinney, Alexander,
Sell, Steldt & De La Hunt
ATTORNEYS

X-RAY FILM CASSETTE

BACKGROUND OF THE INVENTION

The present invention relates to X-ray cassettes for holding sensitized film while taking X-ray photographs, and in one aspect it relates to an X-ray cassette which will provide improved contact between the intensifying screen and the sensitized film. The present invention also provides an improved design for X-ray cassettes which will permit easy and rapid insertion and removal of the sensitized film.

X-ray film cassettes provide a convenience in the handling of X-ray film in radiology laboratories. These cassettes are formed with one or more fluorescent screens that are excited by the X-rays to produce photons which are primarily responsible for the formation of the latent image in the photosensitive film. The cassette generally consists of a light-proof shallow box with a hinged or removable back plate. The front of the cassette is generally thin and made of metal or of plastic material which is not strongly absorptive of X-rays. These prior film cassettes have generally been provided with spring closures and pressure pads to maintain the film in close contact with the screens. These cassettes have the disadvantage however in that the cassettes become warped and/or the felt pressure pads become worn and they do not provide uniform pressure across the screens and film to maintain good uniform contact between the screens and the film. Nonuniform contact between the screens and the film results in variations in the definition or sharpness of the images.

In some cassette constructions, as described in U.S. Pat. Nos. 2,590,891 and 2,590,892, there have been proposals to use electromagnets to hold the cassettes in place and to achieve contact between the screen and film. This is accomplished by a magnet-responsive metal sheet placed in the front of the cassette which will be drawn toward the screen and film to pull the same down toward the electromagnet in the table. This magnet will maintain contact between the fluorescent screen and the photographic film for the duration of the exposure. So long as exposures can be made in the right position on the table the cassette is satisfactory. Other modifications of this principle are shown in a later U.S. Pat. No. 2,694,153, where the magnet-responsive sheet may be made of a stratum of finely divided magnetizable material in a film-forming bonding agent which when placed under the influence of a magnetic field will bring the intensifying screen into close contact with the photo-sensitive film. The disadvantage with these cassettes with a magnet-responsive sheet is that they require that the X-ray facility include an electromagnet in the table to provide a magnetic field.

The problem thus still exists in providing a film cassette which affords rapid exchange of the film and one which is thin and light in weight. Difficulty also exists in trying to meet these requirements and provide a cassette which will assure uniform intimate contact between the intensifying screens and the X-ray film.

The present invention provides an improved cassette construction. The cassette constructed according to the present invention utilizes novel materials and combinations of materials to provide an improved cassette having the properties of economy, convenience, flexibility, light weight, and improved film and screen contact.

SUMMARY

The cassette of the present invention comprises a number of separable sheet-like elements suitably secured together to form a unitary construction. The cassette comprises a first plate formed of a sheet of flexible permanent magnet material, a pair of intensifying screens and a second plate or a sheet of magnetically responsive material, i.e., a sheet which is magnetized or magnetic. The sheets are positioned relative to said screens to apply a force urging them toward one another. The screens are suitably supported or joined together such that they may be separated to permit the cassette to be opened and loaded with a sheet of film under safe light conditions. The cassette also includes means to form a light seal about the film and to confine the film between the screens. The sheets preferably have dimensions which exceed the corresponding dimensions of the film and the flexible permanent magnet material conforms about the screens and films and the magnetic forces hold the screens and film in close contact.

Various embodiments of the cassette of this invention are disclosed and the advantages of the present invention will be more fully understood after reading the following detailed description which refers to the accompanying drawing.

IN THE DRAWING

The cassette constructed in accordance with the present invention utilizes the magnetic forces between at least one flexible permanently magnetized sheet and a magnetically-responsive sheet to uniformly urge, through the magnetic forces, two intensifying screens, disposed one on each side of a sheet of actinic radiation-sensitive film suitable for X-ray photographs, into contact with the X-ray film. The cassette also includes means for supporting the sheets and screens to hold them in position, confine the film, form a seal about the edge of the film and yet permit separation of the sheets affording removal of the film.

Figure 1:
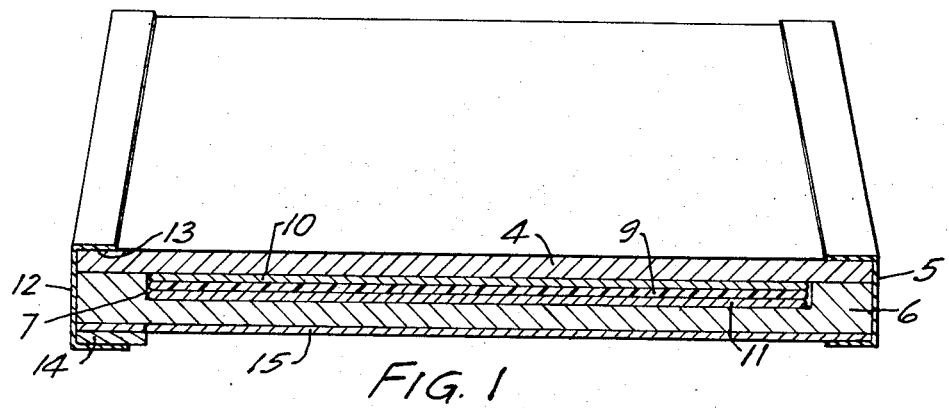
FIG. 1 is a partial perspective view of a cassette according to the present invention with parts shown in longitudinal section.

In the embodiment of the invention illustrated in FIG. 1 the cassette comprises a first or front plate 4, which is generally rectangular in plan view, connected by means of a flexible hinge 5 to a second or bottom plate 6. The front plate 4 is a sheet of magnetically-responsive material. The front plate 4 may comprise a flexible metallic film or sheet which is magnetic or a sheet of flexible material comprising small magnetic particles in a flexible nonmagnetic matrix, which latter sheet may be magnetized or not. The plate 6 is magnetically-responsive and comprises a flexible permanent magnet sheet formed with a shallow recessed area 7 on its inner surface. This recessed area has a depth of between about 0.01 inch to 0.05 inch (0.02–0.12 cm)

and longitudinal and transverse dimensions corresponding generally to the dimensions of a sheet of X-ray film 9 positioned therein. The depth of the recess 7 is sufficient to just accommodate the sheet of film 9 and two X-ray intensifying screens 10 and 11 positioned one on each side of the film. An example of a flexible magnetized composition includes anisotropic, substantially domain-sized particles of a permanent magnet material within a nonmagnetic matrix material. An example of such a flexible permanent magnet material is disclosed in U.S. Pat. No. 2,999,275, issued to Blume. The magnetically-responsive sheets of the plate 4 and plate 6 will thus be attracted toward each other to force said screens toward each other and into intimate contact with opposite sides of the film.

The supporting means for supporting the screens 10 and 11 and plates 4 and 6 to hold them in position and to form a light seal about the edge of the cassette includes the hinge 5 and the extended areas of the plates which are beyond the edges of the screens and film. This fastening or supporting means for supporting the screens and plates about the edge of the cassette may alternatively include a pressure-sensitive adhesive, double coated pressure-sensitive adhesive tape, or suitable mechanical fasteners secured to the opposed faces of the plates beyond the screens. Only the central portion of the plates overlying the screens need have the sheets of magnetically-responsive and magnetized material.

The flexible hinge 5 as illustrated is preferably formed of a thin strip of flexible tape. The tape strip is adhesively fastened at its edges to the plates and preferably comprises a cloth base.

The supporting means illustrated also includes an additional catch to maintain the plate 4 and plate 6 in a secured condition. This catch is formed by a flexible tape strip 12 which is adhesively fastened along one edge 13 to the front plate 4 and has a strip of flexible magnetic material 14 adhesively secured along the opposite edge of the strip 12. The tape strip 12 is of sufficient width to wrap around the edge of the cassette opposite the hinge 5 and the flexible magnetic strip 14 will secure the tape to the back plate 6 by reason of the magnetic attraction of the magnetic strip 14 to the plate 6.

The cassette of FIG. 1 can have various modifications. The front plate 4 may be any sheet or thin foil of magnetic metal. It should be opaque to light and X-ray permeable. It may also be a sheet of magnetic material formed of magnetic particles in a flexible nonmagnetic matrix. The magnetically-responsive sheet of plate 4 may have a thickness of between about 0.0005 to 0.125 inch (0.0012 to 0.03 cm), the lower end of the range being used for the metal sheets or foils and the upper end of the range being preferred for the flexible sheets having the nonmagnetic matrix.

The front plate 4 may be a magnetized sheet similar to plate 6, magnetized in one direction with half of the plate of one polarity and the other half of the opposite polarity. In such instance the back plate 6 would be similarly magnetized with equal polarized areas, positioned with areas of opposite polarity in opposed relationship. These oppositely polarized plates would then attract each other to sandwich the film 9 between the intensifying screens 10 and 11. The intensifying screens 10 and 11 may be adhesively bonded respectively to the front plate 4 and the back plate 6.

The cassette of FIG. 1 may also be constructed where the magnetized back plate 6, which has a thickness beneath the recessed area of between about 0.020 to 0.125 inch (0.05–0.30 cm), is secured to a thin plate 15 of magnetic material. This magnetic plate 15 increases the attractive force of the back plate 6 for the front plate 4, whether the plate 4 is a magnetized or magnetic sheet. A preferable range of thickness for the magnetic sheet 15 is from about 0.002 to about 0.015 inch (0.0012–0.04 cm). An optimum thickness is about 0.005 inch (0.012 cm).

The front plate 4 when formed of a flexible metallic magnetically-responsive sheet which is attracted by a magnetic field (magnetic) may for example be a foil or sheet of iron, steel, iron-nickel-cobalt-manganese alloys, iron-cobalt-nickel-aluminum-copper alloys, or other magnetic alloys.

Flexible magnetically-responsive sheets including the nonmagnetic medium, may include not only the preferable ferrites of barium, strontium, and lead but also alloys such as manganese-bismuth, finely divided iron, etc. The matrix material that may be used in the flexible sheets include elastomeric material such as natural rubber, synthetic rubbers such as polybutadiene/styrene, polyethylene/propylene elastomers, plasticized polyvinylchloride, etc. It is desirable, in order that strong magnetic forces are obtained in the flexible magnetized sheets, that the finely divided particles be of domain size. This size is of the order of one micron for barium ferrite. The particles are dispersed in the elastomeric medium by milling on a rubber mill as is well known by those skilled in the art of compounding elastomeric compositions. The composition is sheeted off of the mill in thin sheets preferably about 0.02 to 0.03 inch (0.05–0.075 cm) in thickness wherein the finely divided particles are oriented in a plane parallel to the surface of the sheet. The oriented sheets are then laminated to the desired thickness and the laminate magnetized by placing it in a magnetic field. For use as the back plate 6 of the cassette, the flexible permanent magnet composition is made to contain about 50 to 95 percent and preferably about 75 to about 93 percent by weight of anisotropic magnetic material.

Figure 2:
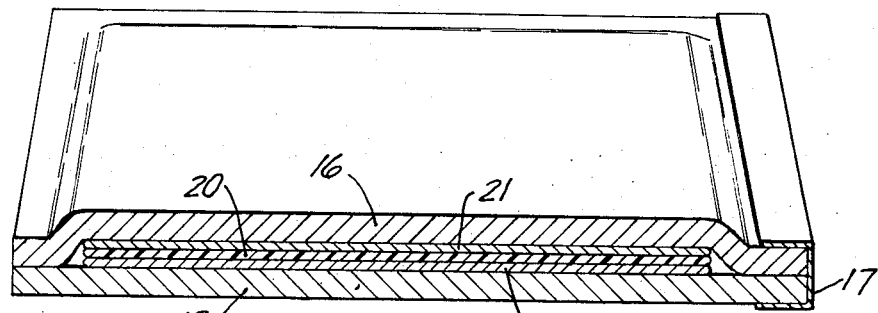
FIG. 2 is a fragmentary perspective view of a second embodiment of a cassette constructed according to the present invention with parts shown in longitudinal section.

Referring now to the embodiment of the cassette illustrated in FIG. 2 there is illustrated a configuration comprising a first or front plate 16 formed of a sheet of magnetized material connected by a hinge member 17 to a back plate 18 of magnetically-responsive material. The hinge member 17 may be formed of a piece of flexible tape which may be a pressure-sensitive adhesive tape having a cloth base as with hinge 5. The front plate 16 may be formed of a flexible permanent magnetic material of about 0.020 inch (0.05 cm) in thickness and with a rectangular configuration having dimensions exceeding that of a piece of sensitized film 20 sandwiched between the front plate 16 and back plate 18 and a pair of X-ray intensifying screens 21 and 22. The back plate 18 may be a sheet of permanently magnetized material which is X-ray permeable or it may be a magnetically-responsive X-ray permeable material attracted by the magnetic field from the front plate 16. With this arrangement of the sheets of the cassette the magnetic attraction between the front plate and the rear plate 18 secure the cassette in a closed position because the dimensions of the two plates exceed that of the film and are suitably flexible to sandwich the film and intensifying screens therebetween. By reason of the flexible nature of the front plate, it conforms about the screens and film and forms a light-tight seal around the edges thereof. The hinge member 17 is convenient in that the two plates 16 and 18 do not have to be placed in register each time the film is changed.

The intensifying screens 21 and 22 may be adhesively bonded to the opposed inner surface of their respective plates 16 and 18 such that they will separate upon the separation of the plates 16 and 18 at the edge thereof opposite the hinge member 17. In this embodiment of the cassette the back plate 18 may be a sheet of cold-rolled steel from 0.001 to about 0.005 inch (0.002–0.012 cm) in thickness and X-ray exposures may be made through this back plate. The thinner metallic sheets may conform about the film and screens more readily than the plate 16. The magnetic attraction will be determined by the strength of the field provided from the front plate 16.

Figure 3:
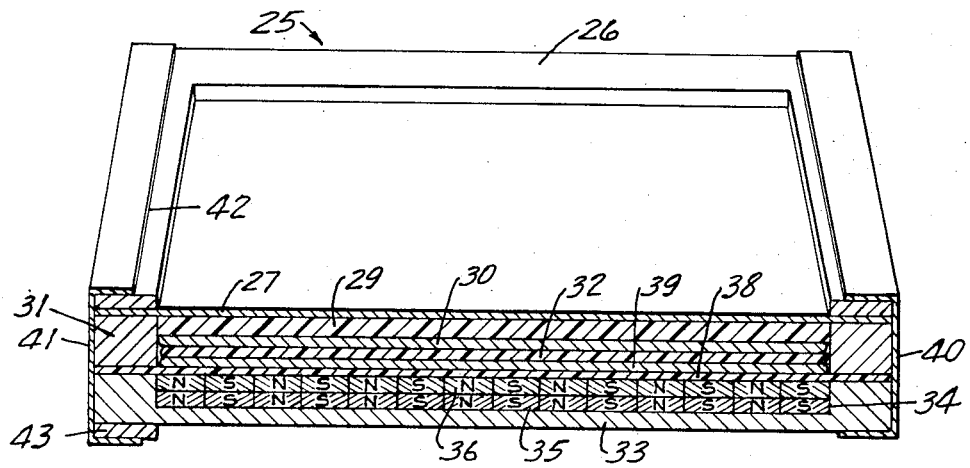
FIG. 3 is a partial perspective view of another embodiment of a cassette constructed in accordance with the present invention with parts shown in longitudinal section.

Referring now to the embodiment disclosed in FIG. 3 the cassette illustrated applies the use of the repelling forces of opposed like magnetic poles to force the intensifying screens toward each other and into intimate contact with each side comprises a first or front plate 25 comprising a rectangular frame-like structure 26 like a picture frame formed of a magnetizable metal or alloy, for example, cold-rolled steel and a dimensionally stable thin sheet 27 formed of material penetratable by the X-ray but impervious to light. The sheet 27 is supported by the frame 26 and may for example be a 0.001 inch (0.002 cm) thick sheet of cold-rolled steel or opacified polyester film from about 0.002 to 0.010 inch (0.005–0.02 cm) thick. Adhesively attached to the thin sheet 27 on the inner surface thereof is a sheet 29 of resilient material about 0.05 inch (0.12 cm) thick (uncompressed) which may be a layer of polyurethane foam. Secured to the foam is a first intensifying screen 30 against which will be positioned one surface of a sensitized film 32. A second rectangular frame 31 formed of flexible magnetized material is secured to the thin sheet 38 opposite the frame 26. The frame 31 has a thickness to accommodate the foam layer in an at least partially compressed state, the screen 30, the film 32 and a second screen 39. The central opening in the frame 31 has dimensions slightly larger than the corresponding dimensions of a sheet of film.

The back plate 33 is a sheet of material that is attracted by a magnetic field and is formed with a central shallow recessed area at 34 on its inner surface. The recessed area is recessed to a depth of about 0.04 to 0.25 inch (0.1–0.6 cm) to allow for the combined thickness of two flexible permanently magnetized sheets 35 and 36 formed as described above. The thickness of the plate 33 beneath the sheets would remain at between about 0.005 and 0.030 inch (0.012–0.075 cm). The sheets 35 and 36 are magnetized in strips having about 4 to 8 magnetic poles per inch across its dimension in one direction. The sheet 35 is held by magnetic attraction against the back plate 33 and the plate 33 aids to increase the magnetic strength of sheet 35. The sheet 36 is arranged over sheet 35 with its magnetic poles in opposed position to the magnetic poles of the sheet 35. Thus the sheets 35 and 36 tend to separate providing an inwardly directed pressure within the cassette. The sheet 36 is confined within the recess 34 by a thin sheet 38 of flexible material which may be a sheet of opaque polyester film or magnetic metal foil having a thickness of about 0.002 inch (0.005 cm). To the inner surface of the sheet 38 opposite the magnetized sheet 36 is adhered the second intensifying screen 39 which will be forced against the opposite surface of the film 32.

The frame 26 and the magnetic frame 31 serve to secure the plate 25 and plate 33 together and to form a light-tight seal with the sheet 27. This light seal and securing means may comprise other supporting means, e.g., the sheet 27 may have an adhesive coating to releasably adhere to the frame 31 at its opposed surface. The surfaces may alternatively have releaseable fabric hook and loop fasteners, such as sold under the tradename "SCOTCH-MATE" and sold by the assignee of this application. As illustrated the cassette of FIG. 3 also has the front plate and back plate secured together by a flexible hinge member 40 running along one edge and the opposite edge is secured by a magnetic catch which comprises a strip of flexible tape material 41 having one edge 42 secured to the frame 26 by adhesive and having a flexible magnetic strip 43 secured along its opposite edge to be attracted to the back plate 33. The flexible strip 41 has sufficient width to extend about the edge of the cassette to position the flexible strip in contact with the edge of the back plate 33.

The flexible magnetized plates have an optimum thickness such that the attractive forces are sufficient to provide good contact between the screens and film and are yet sufficiently X-ray permeable. As the thickness of the flexible magnetic material increases its holding power increases but the penetratability by X-rays is decreased. However, for example, when the exposure is to be made through a back plate the front plate may be thicker to increase its holding power and visa versa. The front plate may also incorporate a finely divided nonmagnetic material such as finely divided lead, to further reduce its penetratability to X-ray radiation.

In the preferred embodiment, referring to FIG. 1, the front plate 4 would be a thin, magnetically-responsive, X-ray penetratable sheet and the back plate 6 would be a flexible permanently magnetized sheet to which would be bonded a magnetically-responsive, field intensifying sheet 15. Exposure would be through the front plate 4 which would be a thin magnetic metal sheet or foil, 0.001 to 0.002 of an inch thick which is either self-supporting, coated or laminated to the inner surface of an X-ray penetratable polymeric film. Suitable supporting means will secure the edges of the cassette.

Having thus described the present invention with reference to several embodiments, it will be appreciated that various other changes and modifications may be made therein without departing from the spirit of the invention or the scope thereof as defined in the appended claims.

What is claimed is:

1. An X-ray cassette for supporting a sheet of sensitized film comprising in combination
   a first flexible magnetized sheet,
   a first X-ray intensifying screen disposed adjacent said first sheet,
   a second X-ray intensifying screen disposed adjacent said first screen,
   a second sheet responsive to a magnetic force and positioned relative to said first sheet and to said screens to cooperate with said first sheet to force said screens toward each other, said first and second sheets each having dimensions at least substantially equal to the corresponding dimensions of said screen, and
   supporting means for supporting said screens about their edges and affording separation of said screens for insertion and removal of a said sheet of film between said screens.

2. An X-ray cassette according to claim 1 wherein said sheets are disposed on opposite sides of said screens and the magnetic forces penetrate the screens and draw the sheets together to force said screens toward each other.

3. An X-ray cassette according to claim 1 wherein a magnetic metal sheet is secured to said first sheet, the surface thereof opposite said first screen.

4. An X-ray cassette according to claim 1 wherein said second sheet is a sheet of flexible magnetized material.

5. An X-ray cassette according to claim 4 wherein said first and said second sheets are positioned adjacent each other, said first and said second sheet are each formed with areas of opposite polarity and have areas of similar polarity in opposed relationship causing said sheets to separate and force one screen adjacent said first sheet in a direction toward said second screen.

6. An X-ray cassette for supporting a sheet of sensitized film comprising in combination
   a first rectangular plate comprising a flexible magnetized sheet having dimensions exceeding the corresponding dimensions of a said sheet of film, said plate having a first and second surface,
   an X-ray intensifying screen disposed adjacent said second surface of said first plate,
   a second X-ray intensifying screen disposed contiguous to said first screen,
   a second plate comprising a sheet responsive to a magnetic force, said second plate being positioned adjacent said second screen and cooperating with said magnetized sheet to force said screens toward each other, and
   supporting means for supporting said first plate and said second plate to seal the cassette about the edges of a said film and to permit separation of said plates and said screens affording insertion and removal of a said film between said screens.

7. An X-ray cassette according to claim 6 wherein said second plate is a sheet of flexible magnetic material comprising anisotropic, substantially domain-sized particles of magnetic material in a flexible nonmagnetic matrix.

8. An X-ray cassette according to claim 6 wherein said second plate has a recessed surface in opposed relationship to said second surface of said first plate, said recessed surface accommodating said screens and a said sheet of film.

9. An X-ray cassette according to claim 8 wherein said supporting means comprises a flexible hinge secured along adjacent edges of said first and second plates.

10. An X-ray cassette according to claim 9 wherein said cassette includes a latch along the edge of said plates opposite said hinge, said latch comprising a tape strip of flexible material secured along one edge to one of said plates and having a strip of flexible magnet material secured along the other edge, said tape strip having a width sufficient to extend about an edge of said plates whereby said strip of flexible magnetic material can contact the other of said plates.

11. An X-ray cassette according to claim 6 wherein a magnetic metal sheet is secured to the first surface of said first plate.

12. An X-ray cassette according to claim 6 wherein said second plate is a sheet of magnetic material which is penetratable by X-ray radiation, and said flexible magnetized sheet comprises anisotropic substantially domain-sized particles of permanent magnet material and finely divided particles of lead in a nonmagnetic flexible matrix.

13. An X-ray cassette according to claim 6 wherein said first plate has a thickness of between 0.020 and 0.125 inch and said second plate has a thickness between 0.0005 and 0.125 inch.

14. An X-ray cassette for supporting a sheet of sensitized film comprising in combination
   a first rectangular plate comprising a frame supporting a resilient sheet and a first X-ray intensifying screen,
   a second rectangular plate comprising a sheet of flexible magnetically-responsive material recessed on a first surface, a pair of rectangular sheets of flexible magnetized material disposed in said recess on said first surface in adjacent relationship, said sheets each being formed with areas of opposite polarity, with the areas of similar polarity on said sheets being positioned in opposed relationship causing said sheets to separate, and a second X-ray intensifying screen positioned adjacent the surface of one of said sheets opposite said sheet of magnetically-responsive material and in a position adjacent said first X-ray intensifying screen, and
   supporting means for supporting said first plate and said second plate for holding the edges thereof together to confine a said sheet of film between said screens whereby the magnetic force between said sheets of flexible magnetized material will force said second screen toward a said film and toward said first screen against the bias of said resilient sheet.

* * * * *